3,436,346
PROCESS FOR PREPARING FILTERABLE
AQUEOUS POLYSACCHARIDE SOLUTIONS
Jack D. Westover, Burnsville, and Robert B. Ferguson, St. Paul, Minn., assignors to The Pillsbury Company, Minneapolis, Minn., a corporation of Delaware
No Drawing. Continuation-in-part of application Ser. No. 538,445, Feb. 28, 1966. This application June 10, 1968, Ser. No. 735,530
Int. Cl. C08b 19/00
U.S. Cl. 252—8.55
10 Claims

ABSTRACT OF THE DISCLOSURE

Aqueous suspensions of fungal mycelium and polysaccharide having a backbone chain of beta 1,3 anhydro D-glucopyranose units and appendant beta 1,6 anhydro D-glucopyranose groups are not suited to permeate microsized pores. By homogenizing an aqueous suspension containing at least 0.5 to about 2.5 weight percent polysaccharide with fungal mycelium, diluting the homogenized aqueous solution to viscosity of about 1 to about 30 cps. and removing the fungal mycelium therefrom, aqueous polysaccharide solutions adapted to readily pass through pores of less than 10 microns are provided.

---

This application is a continuation-in-part of our copending application, Ser. No. 538,445, entitled, "Polysaccharides," which was filed on Feb. 28, 1966.

This invention relates to a method of processing polysaccharides and the products thereof, more particularly, this invention relates to a method of providing a low viscosity, aqueous polysaccharide composition.

It has been recognized that a considerable amount of oil which is retained by porous subterranean formations cannot be recovered by normal pumping operations. To recover such oil, it is known that viscous, aqueous solutions injected into the subterranean formations will displace and expel the oil therefrom. The expelled oil may then be recovered by conventional pumping means. The viscous, aqueous solution employed in expelling the oil must be capable of permeating porous rock formations. Aqueous solutions containing polysaccharides such as disclosed in U.S. Patent No. 3,301,848 by Frank E. Halleck are viscous. Unfortunately, dilute solutions thereof contain gel-like masses which inhibit the permeation of the aqueous solution through such a subterranean formation.

It is an object of the present invention to provide a method of effectively separating a polysaccharide from the fungal mycelium contained therein.

Another object of the invention is to provide a low-cost method of separating polysaccharide from the fungi contained therein.

A still further object of the present invention is to provide a method for producing dilute, aqueous solutions of a polysaccharide exhibiting unexpectedly superior permeative properties.

According to the present invention there is provided a method of preparing dilute, aqueous polysaccharide solutions possessing superior permeative properties, said method comprising the steps of:

(a) Providing an aqueous suspension of a polysaccharide comprising water, a polysaccharide consisting essentially of a polymeric chain of D-glucopyranose units linked by a beta 1,3 linkage with appendant anhydro glucopyranose groups contiguously attached to the polymeric chain via beta 1,6-linkages in an amount ranging from at least 0.5 to about 2.5 percent by weight of the water and fungal hyphae in an amount ranging from about 0.20 to about 2.0 percent of the water weight;

(b) Subjecting said aqueous suspension to a shearing force for a period of time sufficient to provide a homogeneous dispersion of the polysaccharide, said homogeneous dispersion of polysaccharide being further characterized as containing the polysaccharide in a physical form sufficient to permit the passage of 500 milliliters of an aqueous solution consisting of water and polysaccharide through a 5-micron filter under a vacuum of 20 inches of mercury when said aqueous solution of water and polysaccharide is diluted with a sufficient amount of water to provide a viscosity of 15 cps. as ascertained by a Brookfield viscometer employing an ultra low viscosity adapter operated at 30 r.p.m. and a temperature of 23° C.;

(c) Diluting the homogeneous dispersion of the polysaccharide with a sufficient amount of water to provide a viscosity ranging from about 1 to about 50 cps. as ascertained by a Brookfield viscometer employing an ultra low viscosity adapter operated at 30 r.p.m. and a temperature of 23° C.;

(d) Separating said fungal hyphae from said homogeneous dispersion to provide an aqueous polysaccharide dispersion having improved permeability properties as evidenced by the passage of 500 milliliters of said homogeneous dispersion through a 5-micron filter under a vacuum of 20 inches of mercury and at a temperature of 23° C.

Prior to subjecting the aqueous suspension to the shearing force, it is an essential embodiment of the invention to provide an aqueous suspension comprised of water and the polysaccharide in an amount ranging from at least 0.5 to about 2.5 percent by weight of the water. Subjecting an amount of polysaccharide outside the aforementioned range to a shearing force adversely effects the filtration properties of the resultant aqueous solution provided herein.

A typical aqueous suspension adaptable herein is the fermentation product such as disclosed in U.S. Patent No. 3,301,848. Another suitable source of providing an aqueous suspension is to disperse a dry, solid polysaccharide composition containing the fungal hyphae with an appropriate amount of water. Illustrative suitable, dry polysaccharides include an unhomogenized and homogenized dried fermentation product such as disclosed in Example I, Runs A and B of our copending application, Ser. No. 538,445.

In general, the polysaccharides to which the present invention is applicable are those water-soluble polysaccharide molecules consisting essentially of polymeric backbone chain of D-glucopyranose units attached to one another via the beta 1,3 linkage with appendant glucopyranose groups contiguously attached to the backbone chain by a beta 1,6 linkage. Illustrative polysaccharides having the aforementioned structure are disclosed in U.S. Patent No. 3,301,848 by Frank E. Halleck. As indicated in U.S. Patent No. 3,301,848, the polysaccharides having the beta 1,3 polymeric chain are further characterized by the ratio of D-glucopyranose units within the chain free from D-glucopyranose groups to those which have appendant D-glucopyranose groups linked to the polymeric chain via beta 1,6 linkage (hereinafter referred to as a "ratio"). The ratio can be ascertained by subjecting the polysaccharide to a beta 1,3 D-glucanase derived from the organism Basiodiomycete No. 806 (collection maintained by the Microbiology Laboratory, Quartermaster Research and Engineering Center, Natick, Mass.). The beta 1,3 D-glucanase enzymatically cleaves the beta 1,3 bonds without disrupting the beta 1,6 linkages, thus providing D-glucose and gentiobiose. The water-soluble polysaccharide compositions adaptable herein generally have an average molecular weight of at least 19,000 and a ratio ranging from about 3:1 to about 1:3. Advantageously employed in the method of the present invention are those polysaccharides having an average molecular weight in excess of 50,000 and a ratio of at least 3:1 to about 4:3. Superior results are achieved from those polysaccharides having an average molecular weight of about 100,000 to about 300,000 and containing about 33 to about 40 percent of the polymeric chain units contiguously attached to glucopyranose groups via the beta 1,6 linkage (i.e., a polysaccharide having a ratio of about 2:1 to about 3:2).

A suitable starting material for providing the aqueous suspension of polysaccharide and fungal hyphae is a fermented culture medium containing, on a water weight basis, at least 0.5 to about 2.5 weight percent polysaccharide. In general such fermentation products contain from about 90 to 99.5 percent by weight water with the remaining portion consisting essentially of polysaccharide, fungal mycelium and a minor portion of unmetabolized nutrients such as carbohydrates, mineral salts and yeast extracts. Most generally, the fermentation contains from about 1 to about 5 weight percent solids of which about 50 weight percent comprises the polysaccharide and about 25 weight percent of the solid fermentate product comprises the fungal mycelium.

As disclosed in U.S. Patent No. 3,301,848, the fermentation products are prepared by inoculating a culture medium with a polysaccharide producing organism. A typical medium consists of a carbohydrate source such as dextrose, sucrose, fructose, maltose, starch, lactose, etc., a nitrogenous material (e.g., yeast extract) along with the mineral salts contained in Czapek Dox Broth. The inoculated medium is then aerated and maintained at a temperature ranging from about 25° C. to about 35° C. for about 2 to 6 days, thus providing the ferment in which the fungal mycelium is encapsulated by the polysaccharide produced thereby.

Typical polysaccharides and polysaccharide compositions containing the polysaccharide producing organism to which the present invention is directed include those polysaccharides prepared from microorganisms such as:

*Sclerotium coffeicolum* Stahel, American Type Culture Collection No. 15208; *Sclerotium delphinii* Stevens, American Type Culture Collection No. 15196; *Sclerotium delphinii* Gilman, American Type Culture Collection No. 15197; *Sclerotium rolfsii* Gilman, American Type Culture Collection No. 15195; *Sclerotium rolfsii* Barnett, American Type Culture Collection No. 15201; *Sclerotium rolfsii* Barnett, American Type Culture Collection No. 15206; *Sclerotium rolfsii* Barnett, American Type Culture Collection No. 15203; *Sclerotium delphinii* Welch/White, American Type Culture Collection No. 15200; *Corticium rolfsii* (Sacc) Curzi, American Type Culture Collection No. 15212; *Corticium rolfsii* Curzi/Ficus, American Type Culture Collection No. 15209; *Sclerotium rolfsii* QM, American Type Culture Collection No. 15202; *Sclerotium rolfsii* QM, American Type Culture Collection No. 15204; *Sclerotium delphinii* Welch/Mix, American Type Culture Collection No. 15199; *Sclerotium delphinii* Stevens I, American Type Culture Collection No. 15194; *Sclerotium rolfsii* Barnett, American Type Culture Collection No. 15205; *Stromatinia narcissi* Groves, American Type Culture Collection No. 15213; *Sclerotinia gladoli* Drayton/Massey, American Type Culture Collection No. 15207; *Corticium rolfsii* (Sacc) Curzi, American Type Culture Collection No. 15210; *Corticium rolfsii* Curzi/Balducci, American Type Culture Collection No. 15211; *Sclerotium delphinii* Jersveld/Welch, American Type Culture Collection No. 15198; *Claviceps purpurea*; *Plectania occidentalia* (NRRL 3137); *Helotium gp.* (NRRL 3129); *Pullularia pullulans*; *Penicillum chrysogenum*; *Agrobacterium tumefaciens*; *Monodus subterraneus*; *Microsporum quinckeanum*; *Saccharomyces cerevisiae*; *Candida albicans*; *Cryptococcus laurentii*; *Phoseolas aureus* seedlings; *Euglena viridis*; *Euglena geniculta* and the like.

As indicated in our copending application, Ser. No. 538,445, filed Feb. 28, 1966, it has been found that the polysaccharide is provided in the aqueous culture medium or fermentation medium as distinct oval capsular bodies having a maximum diameter from about 1 to about 5 mm. These capsular bodies are composed primarily of a polysaccharide mass and fungi mass. The polysaccharide producing fungi upon microscopic examination appears as a centrally disposed mass of a plurality of hyphal filaments which are tightly bound together in the form of hyphal aggregates encapsulated by a polysaccharide mass. Since the fungi aggregates during the polysaccharide producing cycle tend to increase the polysaccharide concentration about each polysaccharide producing hyphal aggregate, a strongly associated polysaccharide mass results. The resultant polysaccharide mass with the accompanying strong associative forces between polysaccharide molecules provides a viscous but gel-like mass possessing an inherent resistant to uniform distribution of the polysaccharide throughout the surrounding water phase. It has been found that the polysaccharide associative forces are not substantially altered by dilution and/or by simple mixing or stirring. Such mild shearing methods fail to impart a sufficient amount of energy to disrupt the associative forces between the polysaccharide molecules.

The aqueous suspension may also be provided by dispersing a dry polysaccharide composition containing the fungal hyphae into an aqueous medium. A suitable, dry polysaccharide can be obtained from removing water from the fermentation solids. Generally, the dried polysaccharide masses therefrom are in the capsular form hereinbefore described. Another suitable dry polysaccharide composition containing fungal hyphae and adaptable herein is disclosed in our copending application, Ser. No. 538,445, wherein a dry polysaccharide composition possessing an improved rate of hydration is achieved by homogenization of the fermentation medium prior to the drying thereof. Drying concentrates the polysaccharide molecules thereby creating conditions whereby the associative forces are reestablished to a certain degree. Upon reconstitution with water, the associative forces are of a sufficient magnitude to provide a plurality of gel-like polysaccharide masses throughout the aqueous medium. These gel-like polysaccharide masses are of sufficient size and quantities such that extremely small, porous structures (e.g., a 10-micron filter) are readily clogged thereby.

The aqueous suspension is then subjected to a shearing action sufficient to provide a solution of the polysaccharide. The shearing action is of a magnitude sufficient to disrupt the associative forces between the polysaccharide molecules provided in the aqueous suspension. When the aqueous suspension is provided as the fermentation product wherein the polysaccharide is primarily provided as capsular bodies containing the fungal hyphal aggregates, the shearing force should be sufficient to disassociate the hyphal aggregates and provide a uniform dispersion of hyphal filaments therein.

A suitable means of ascertaining the necessary shear force may be calculated from the following formula:

$$\frac{t-t_1}{t}=B$$

wherein $t$ represents the time in minutes necessary to obtain a viscosity value of 80 percent of an aqueous dispersion of the polysaccharide composition which has been blended with a Waring Blendor (Model CB–3 manufactured by Waring Products Corporation) for 1 minute at 19,000 r.p.m. at a temperature of 23° C. and allowed to hydrate for 24 hours at 23° C.; $t_1$ is the time in minutes necessary for the aqueous solution to achieve the viscosity of $t$ and B is a fraction having a value of at least 0.1, said $t$ and $t_1$ values being based upon the enhanced hydration rate of the dried polysaccharide composition therefrom and containing less than 6 percent by weight water. Advantageously, B has a value of at least 0.25 with superior hydrated polysaccharides being provided when B is a value of at least 0.5. A more detailed explanation thereof may be found in our copending application, Ser. No. 538,445.

In order to impart a sufficient quantum of shearing action and thus disrupt the associative forces, the level of polysaccharide molecules provided by the aqueous suspension is at least 0.5 weight percent and generally less than about 2.5 weight percent of the total amount of water contained therein. Advantageously, the aqueous suspension contains on a total water weight basis from about 0.75 to about 2.0 weight percent polysaccharide. Superior results in effectively shearing and disrupting the associative forces between the polysaccharide molecules is achieved by employing an aqueous suspension containing from 1.0 to 1.5 weight percent polysaccharide. The amount of fungal hyphae on a water weight basis in the aqueous suspension usually ranges from about 0.4 to about 1.0 percent and preferably from about 0.5 to about 0.8 percent.

The recitation "aqueous solution" in contradistinction to an "aqueous suspension" as defined in the present invention refers to the degree of disassociation of the polysaccharide molecules within the aqueous medium. An aqueous suspension of the polysaccharide molecules comprises a plurality of gel-like polysaccharide masses suspended throughout the aqueous phase. Such an aqueous suspension is further characterized as consisting of a sufficient amount of gel-like polysaccharide masses suspended in the water phase to prevent the passage thereof through a 5-micron filter. Consequently, an aqueous suspension containing the polysaccharide gel-like masses and which is substantially free from other water-insoluble particles having a particle size greater than 5 microns (e.g., fungal mycelium in amounts greater than incidental impurities) is diluted with water to a viscosity of 15 cps. the resultant dilute aqueous suspension under a vacuum pressure of 20 inches of mercury readily clogs a 5-micron filter (e.g., less than 500 ml. of the the aqueous medium can be collected as a filtrate). In contrast thereto, an aqueous solution of the polysaccharide molecules which is substantially free from other water-insoluble particles having a particle size greater than 5 microns and under identical filtration conditions readily passes through the filter.

A suitable method for preparing the aqueous polysaccharide solutions is via a homogenizer whereby the aqueous suspension is pumped at a high pressure through an orifice. Such devices provide positive flow paths in which the gel-like polysaccharide masses are subjected to intense shear during transit therein. Illustrative homogenization pressures range from at least 500 to about 10,000 p.s.i. Exceptional results are obtained at pressures ranging from about 1,000 to about 3,500 and most preferably at about 1,500 to about 3,000 p.s.i.

After the aqueous suspension has been subjected to a shearing action, the aqueous solution is diluted with a sufficient amount of water to provide an aqueous solution having a viscosity ranging from about 1 to about 30 cps. and preferably within the range of about 10 to about 20 cps.

The fungal hyphal filaments are then separated or removed from the dilute aqueous solution. Suitable means for removing the filaments include filtration and centrifugation.

In a more limited aspect of the present invention there is provided a method for preparing dilute aqueous solutions of a polysaccharide composition, said method comprising the steps of:

(a) Providing an aqueous suspension containing on a total weight water basis from about 0.2 to about 2.0 percent by weight fungal mycelium and from at least 0.5 to about 2.5 percent by weight polysaccharide, said polysaccharide consisting essentially of a polymeric chain of D-glucopyranose units linked by a beta 1,3 linkage with appendant anhydro glucopyranose groups contiguously attached to the polymeric chain via beta 1,6 linkages;

(b) Subjecting said aqueous suspension to a shearing force for a period of time sufficient to provide an aqueous solution, said aqueous solution being further characterized as containing a homogeneous dispersion of the polysaccharide molecules in a physical form sufficient to permit the passage of 500 milliliters of an aqueous solution consisting of water and polysaccharide molecules through a 5-micron filter under a vacuum pressure of 20 inches of mercury when said aqueous solution is diluted with a sufficient amount of water to provide a viscosity of 15 cps. as ascertained by a Brookfield viscometer employing an ultra low viscosity adapter operated at 30 r.p.m. and a temperature of 23° C.;

(c) Diluting the aqueous solution of the polysaccharide with an additional amount of water sufficient to provide a diluted aqueous solution having a viscosity from 1 cps. to 50 cps. as ascertained in a Brookfield viscometer employing an ultra low viscosity adapter operated at 30 r.p.m. and at a temperature of 23° C.;

(d) Separating the aqueous solution containing the polysaccharide from the hyphal filaments by a rotary filter by:

(1) Intermittently exposing the exterior sections of the rotary precoated filter medium to the diluted aqueous solution to saturate said exterior precoat sections;

(2) Continuously applying a pressure to extract the aqueous solution containing the polysaccharide therefrom; and, (3) After substantially extracting the aqueous solution containing the polysaccharide from the filter medium but before resaturation thereof removing a fractional part of the hyphal filaments and filter medium thus permitting further extraction of the aqueous solution containing the polysaccharide therethrough.

In this more limited aspect of the invention, Steps (a)–(c) are conducted in the manner hereinbefore described, however, separation of the hyphal filaments from the diluted aqueous solution (i.e., above Step d) is accomplished via a continuous rotary drum filter such as disclosed in the Weineke U.S. Patent No. 2,083,887, the Doescher U.S. Patent No. 2,270,938, the Que U.S. Patent No. 2,308,716 and the like. In general, the continuous rotary drum filter employs a rotary drum filter medium which intermittently passes through a bath containing the diluted aqueous solution By employing a pressure (e.g., a vacuum upon the interior of the rotary drum) the aqueous solution containing the polysaccharide permeates the filter medium whereas the hyphal filaments are retained upon its exterior. Since the filter medium tends to become clogged with the insoluble materials (e.g., the mycelium) upon successive passes, this problem is obviated by removing a portion of the filter medium (e.g., via cutting with a doctor blade) along with the retained hyphal filaments. Suitable filter medium for this purpose include filter aids such as disclosed on pages 969–970 of the Chemical Engineers Handbook, copyright 1950, published by the McGraw-Hill Book Company, Inc.

Example I.—Preparation of the fermentation product

A sterile culture medium consisting of the following percents by weight was prepared:

| Ingredient: | Percent by weight |
|---|---|
| Distilled water | 94.80 |
| Glucose | 4.50 |
| Corn steep solids | 0.25 |
| $NaNO_3$ | 0.20 |
| $K_2HPO_4$ | 0.10 |
| $MgSO_4.7H_2O$ | 0.15 |

The pH of the resulting medium was adjusted at 4.5 with hydrochloric acid and the medium heated at 250° F. for 1 hour at 15 p.s.i. steam pressure. The inoculum of

*Sclerotium rolfsii* Barnett, American Type Culture Collection No. 15206 was developed through four stages in the above medium, using shake flasks and a 10-liter mechanically agitated and aerated fermenter. 4.0 volume percent was used in each transfer with incubation at 30° C. for three days.

After the culture medium had cooled, 8.0 volume percent of the above inoculum was added to a fermenter vessel (containing 1800 gallons of the above sterile medium) equipped with a variable speed agitator, a sterile air supply and temperature control means. The medium was incubated for 70 hours at a temperature of 28° C. an agitation rate of 96 r.p.m. and an aeration rate of 0.8 vol./vol. of medium per minute. The ferment was then heated to 93° F. for 15 minutes and cooled to 23° F. to inactivate the enzymes and kill the fungi. Analysis indicated that the fermentation product contained about 96 weight percent water with the remaining being of solids which about 1.5 weight percent consisted of the polysaccharide and 0.6 percent by weight fungi.

The resultant fermentation product was then homogenized via a single homogenizer (Model 35C490—400 gallons per hour—manufactured by Creamery Package Manufacturing Division of St. Regis) at a pressure of 2,000 p.s.i. and at a temperature of 23° C.

The homogenized fermentation product was further diluted with 75 parts by weight water for each part by weight of the homogenized product.

In separating the hyphal filaments from the diluted aqueous homogenized product, a continuous rotary vacuum drum filter was employed. The filtering means was a continuous rotary vacuum drum filter, manufactured by Eimco of Salt Lake City, Utah, having 250-square feet of a stainless steel dutch weave filter cloth (a 24 x 120 cloth).

The precoat filtrate of filter aid employed on the screen was a diatomaceous silica powder, "Celite 545" manufactured and distributed by Johns-Mansville, Inc. The doctor blade was set at $\frac{1}{32}$ inch with a drum speed of ½ r.p.m. The filtration was conducted at a feed rate of 1200 gallons per hour and under a vacuum of 20 inches of mercury. After four hours of operation, the filtration rate remained at 1200 g.p.h. without a concomitant clogging thereof.

Substantially all (e.g., at least 98 percent by weight) of the polysaccharide was recovered as filtrate. Viscosity of the filtrate was about 15 cps.

Five liters of the resultant filtrate was then subjected to filtration through a 5-micron filter (a catalog No. XX40 04700 type "Millipore" filter distributed by the Millipore Filter Corporation of Bedford, Mass.) under 20 inches of mercury pressure. The filtrate readily passed through the filter without a concomitant clogging thereof.

What is claimed is:

1. A method of preparing dilute, aqueous polysaccharide solutions possessing superior permeative properties, said method comprising the steps of:
   (A) providing an aqueous suspension of a polysaccharide comprising water, a polysaccharide consisting essentially of a polymeric chain of D-glucopyranose units linked by a beta 1,3 linkage with appendant anhydro glucopyranose groups contiguously attached to the polymeric chain via beta 1,6 linkages in an amount ranging from at least 0.5 to about 2.5 percent by weight of the water and fungal hyphae in an amount ranging from about 0.20 to about 2.0 percent of the water weight;
   (B) subjecting the aqueous suspension of the polysaccharide to a shearing force and for a time sufficient to provide an aqueous solution, said aqueous solution being characterized by a B value of at least 0.1 as ascertained by the following relationship:

$$\frac{t-t_1}{t}=B$$

wherein $t$ is the time in minutes necessary to obtain 80 percent of the 24-hour viscosity value of the dried nonhomogenized polysaccharide when 1 gram of the dried nonhomogenized polysaccharide composition is dispersed in 100 grams of water and subjected to 1 minute blending by a Waring Blendor operated at 19,000 r.p.m. at 23 °C. and allowed to remain for 24 hours at 23° C., $t_1$ is the time in minutes necessary for the dried homogenized polysaccharide composition to obtain 80 percent of the 24-hour viscosity value of the polysaccharide when 1 gram of the dried homogenized polysaccharide composition is dispersed in 100 grams of water and subjected to 1 minute blending by a Waring Blendor operated at 19,000 r.p.m. and maintained at 23° C., B is a fraction having a value of at least 0.10, said viscosity being determined by a Brookfield viscometer employing a No. 3 spindle operated at 30 r.p.m. and maintained at a temperature of 23° C.

(C) diluting the homogeneous dispersion polysaccharide with a sufficient amount of water to provide a viscosity ranging from about 1 to about 50 cps. as ascertained by a Brookfield viscometer employing an ultra low viscosity adapter operated at 30 r.p.m. and a temperature of 23° C.;
   (D) separating said fungal hyphae from said homogeneous dispersion to provide an aqueous polysaccharide dispersion having improved filtration properties as evidenced by the passage of 500 milliliters of said homogeneous dispersion through a 5-micron filter under a vacuum pressure of 20 inches of mercury and at a temperature of 23° C.

2. The method according to claim 1 wherein the aqueous suspension contains on a water weight basis from about 0.75 to about 2.0 weight percent polysaccharide.

3. The method according to claim 2 wherein the aqueous solution is diluted with a sufficient amount of additional water to provide a viscosity at 23° C. ranging from about 10 to about 20 cps.

4. The method according to claim 3 wherein the shearing force is conducted under a homogenization pressure ranging from about 1,000 to about 3,500 p.s.i.

5. The method according to claim 4 wherein B is a fraction having a value of at least 0.25.

6. The method according to claim 5 wherein the hyphal filaments are separated by a rotary filter by:
   (A) intermittently exposing the exterior sections of the rotary precoated filter medium to the diluted aqueous solution to saturate said exterior precoat sections;
   (B) continuously applying a pressure to extract the aqueous solution containing the polysaccharide therefrom; and,
   (C) after substantially extracting the aqueous solution containing the polysaccharide from the filter medium but before resaturation thereof removing a fractional part of the hyphal filaments and filter medium thus permitting further extraction of the aqueous solution containing the polysaccharide therethrough.

7. The method according to claim 6 wherein at least a major portion of the fungal hyphae is provided in the aqueous suspension as caspular bodies of fungal hyphal aggregates encapsulated by the polysaccharide.

8. The method according to claim 7 wherein the shearing force is sufficient to disassociate the hyphal aggregates and provide a uniform dispersion of the hyphal filaments therein.

9. The method according to claim 8 wherein B has a value of at least 0.5.

10. The method according to claim 9 wherein a rotary vacuum filter is employed to separate the hyphal filaments from the aqueous solution.

(References on following page)

References Cited

UNITED STATES PATENTS

| | | | | |
|---|---|---|---|---|
| 2,801,955 | 8/1957 | Rutenberg et al. | | 260—209 |
| 2,871,235 | 1/1959 | De Jilvoice | | 260—209 |
| 3,019,138 | 1/1962 | Doggett et al. | | 260—209 |
| 3,205,125 | 9/1965 | Opie et al. | | 260—209 |
| 3,301,848 | 1/1967 | Halleck | | 260—209 |

LIONEL M. SHAPIRO, *Primary Examiner.*

U.S. Cl. X.R.

195—31; 260—209